(12) United States Patent
Trautmann et al.

(10) Patent No.: US 6,942,709 B2
(45) Date of Patent: Sep. 13, 2005

(54) SWITCHABLE CYCLONE FOR SEPARATING PARTICLES OR DROPLETS FROM A FLUID STREAM

(75) Inventors: Pius Trautmann, Stuttgart (DE); Michael Durst, Frankenhardt (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 141 days.

(21) Appl. No.: 10/365,605

(22) Filed: Feb. 13, 2003

(65) Prior Publication Data

US 2003/0221398 A1 Dec. 4, 2003

(30) Foreign Application Priority Data

Feb. 14, 2002 (DE) .......................... 102 05 981

(51) Int. Cl.$^7$ ............................................. B01D 45/12
(52) U.S. Cl. .................... 55/346; 55/459.1; 210/512.1; 209/711; 209/717
(58) Field of Search .................... 210/322, 512.1, 210/512.2; 209/711, 717, 728, 734; 55/346, 459.1

(56) References Cited

U.S. PATENT DOCUMENTS 4,634,535 A * 1/1987 Lott .......................... 210/512.2
5,947,300 A * 9/1999 Lange .......................... 209/734

FOREIGN PATENT DOCUMENTS

DE          19803872          8/1998

* cited by examiner

*Primary Examiner*—David A. Reifsnyder
(74) *Attorney, Agent, or Firm*—Crowell & Moring LLP

(57) ABSTRACT

A cyclone arrangement for separating particles or droplets from a fluid stream, including at least two cyclones (1, 2, 3; 21, 22, 23), which have a tangential intake opening (4, 5, 6; 24, 25) for the fluid stream and set the fluid stream into rotation so that due to the resulting centrifugal force, particles or droplets to be separated from the fluid stream may be discharged from the cyclone separator through discharge openings (10, 11, 12). A plurality of cyclones are connected in parallel, and the intake openings (4, 5, 6) of the cyclones are closed or opened by a common slider (17; 24), which also has an opening (15, 16, 17; 24, 25) in the vicinity of each cyclone intake opening for passage of the fluid stream. The position and size of each slider opening is designed such that in various slider settings, the fluid stream will reach a different number of cyclone intake openings.

8 Claims, 1 Drawing Sheet

SWITCHABLE CYCLONE FOR SEPARATING PARTICLES OR DROPLETS FROM A FLUID STREAM

BACKGROUND OF THE INVENTION

The present invention relates to a centrifugal separator for separating particles from a fluid stream, for example, for separating oil, water, or solid particles from a gas stream.

A centrifugal oil separator, which acts as a cyclone for a venting device for a crankshaft housing, in which an oil-air mixture is introduced at the intake side and an outlet for the purified air and an outlet for the oil are present on the discharge side, is known from German Patent Application No. DE 198 03 872.

Centrifugal separators in which individual cyclones are assembled as a multicyclone, in order to exploit the improved effect with a lower cyclone diameter and nonetheless have a large gas throughput, are also known. It is problematic in this case that the previously described cyclone separator arrangements are typically designed for a specific throughput range, so that both the degree of separation and the pressure loss may change disadvantageously if the throughput deviates from the rated throughput.

SUMMARY OF THE INVENTION

It is an object of the present invention to provide an improved multicyclone separator for separating contaminants from a fluid stream.

Another object of the invention is to provide a multicyclone arrangement for separating particles from a fluid stream which can be optimally adapted to different operating conditions.

These and other objects are achieved in accordance with the present invention by providing a cyclone arrangement for separating particles or droplets from a fluid stream, comprising at least two cyclones arranged in parallel, each cyclone having a tangential intake opening for the fluid stream and acting to set a fluid stream introduced through the intake opening into rotation so that due to a resulting centrifugal force, particles or droplets to be separated from the fluid stream are deposited on an outer wall and discharged through a discharge opening at the bottom of each cyclone, wherein the cyclone intake openings are each closed or opened individually, particularly by a common slider having openings for the fluid in the vicinity of the cyclone intake openings.

The aforementioned cyclone separator arrangement for separating particles from a fluid stream comprises at least two cyclone cells, which each have a tangential intake opening for the fluid stream and set the fluid stream into rotation, so that the particles to be separated are deposited on the outer wall by the centrifugal force which arises in the fluid stream.

According to the present invention, the cyclone separators are advantageously connected in parallel, and the intake openings for the fluid stream are each opened or closed individually.

In a particularly advantageous arrangement, multiple intake openings are opened or closed using a common slider, which also has an opening in the vicinity of each of the intake openings for passage of the fluid stream. The position and size of these openings in the slider are designed in such a way that in various slider settings, the fluid stream may reach a different number of intake openings.

For example, for rotors (cyclones) which lie next to one another, the common slider may have a small opening for the first cyclone which only lies opposite the respective intake opening in one slider position. The slider has increasingly larger openings for the second cyclone and each of the further cyclones, so that these openings may also be opened in further slider positions in accordance with the size of the opening.

In accordance with one preferred embodiment, the cyclones lie next to one another in a row and the slider is a translationally moved plate.

In a second preferred embodiment, which is also advantageous, the cyclones are positioned in a cylindrical arrangement on a circular path, and the slider is a rotatable annular cylinder.

By using such cyclones advantageously connected in parallel according to the present invention, successive individual cyclones may be easily placed in service linearly or in rotation by the slider with increasing throughput, for example. Therefore, the problems arising in the prior art may be avoided, and it can be assured that the cyclones always operate in their rated throughput range. It should be noted that in such cases, the cyclones which are sequentially placed in service do not necessarily always have to have the same overall dimensions.

For example, there may advantageously be three cyclones, which are positioned linearly next to one another or around a circumference, such that (a) in a first slider position, all three cyclones are accessible to the fluid stream; (b) in a second slider position, the second and the third cyclone are accessible, and (c) in a third slider position, only the third cyclone is accessible.

The invention is particularly useful to separate liquids or solids from gas streams. For example, one advantageous application of the present invention is to use such an arrangement of centrifugal separators to separate oil droplets from a gas stream vented from a crankshaft housing of a motor vehicle engine. Another advantageous application of the invention is to use such an arrangement to separate water droplets from gas streams in a fuel cell vehicle.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
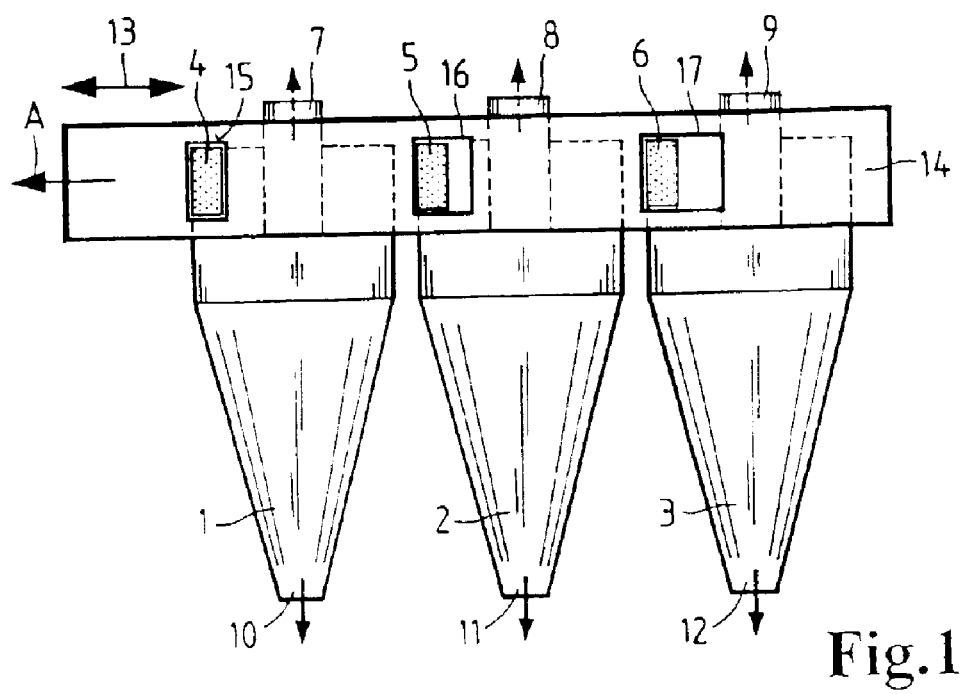
FIG. 1 depicts a first illustrative embodiment in which three cyclones are arranged linearly next to one another and the cyclone intake openings are controlled using a linear slider.

An arrangement of three cyclones 1, 2, 3 for separating oil from the crankshaft housing vent gas of a motor vehicle is shown in FIG. 1. In this arrangement, the oil-air mixture from the crankcase is conducted to the intake openings 4, 5, 6 of cyclones 1, 2, 3. The mixture is made to rotate in a known way in the cyclones 1, 2, and 3, so that a cleaned gas flows out on top from openings 7, 8, and 9 and the heavier oil is deposited on the walls of the cyclones 1, 2, and 3 and ultimately flows out at the bottom through discharge openings 10, 11, and 12.

A slider 14, which is linearly movable in the direction of arrow 13, is used to open and/or close the openings 4, 5, 6 in the cyclones 1, 2, 3. For this purpose, there is an opening 15 in the slider 14, which only registers with and thereby opens the intake opening 4 of the cyclone 1 in the slider position shown here. There is a larger intake opening 16 for the cyclone 2, which additionally is aligned with and thus opens the intake opening 5 of the cyclone 2 in a second slider position in which the slider has been moved to the left. There is an even larger intake opening 17 for the cyclone 3, which additionally unblocks the intake opening 6 of the cyclone 3 in a third slider position, in which the slider has been moved even further to the left.

Accordingly, the illustrative embodiment shown in FIG. 1 provides an arrangement through which all three intake openings 4, 5, and 6 of the cyclones 1, 2, and 3 may be supplied with the mixture to be purified in a first slider position. In a second slider position, the intake openings 5 and 6 of the cyclones 2 and 3 are supplied with the mixture to be purified, since the relatively smaller opening 15 of the slider 14 is pushed away from the opening 15 of the cyclone 1 and consequently seals it. In the third slider position, only the intake opening 6 of the cyclone 3 is supplied with the fluid mixture to be cleaned, since in this case the relatively smaller openings 15 and 16 of the slider 14 have been pushed away in turn from the openings 15 and 16 of the cyclones 1 and 2.

Figure 2:
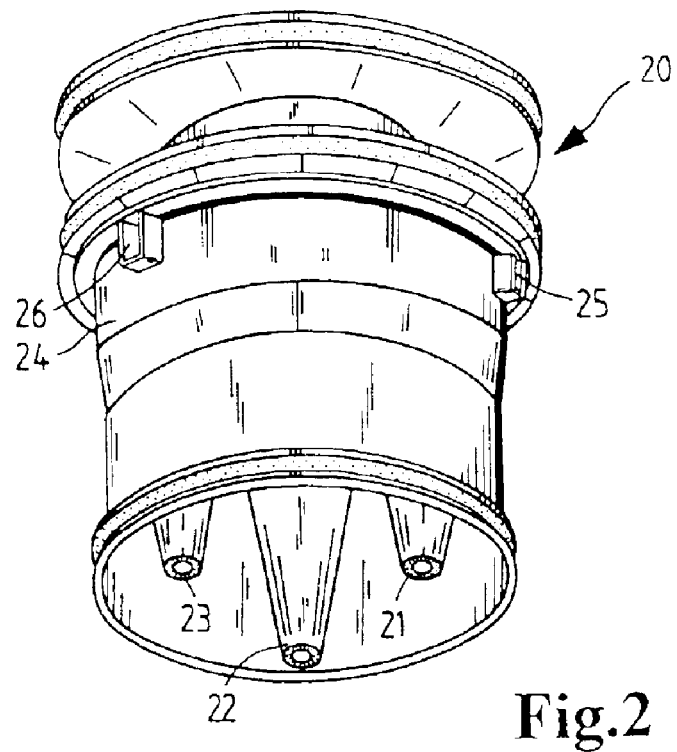
FIG. 2 shows a second illustrative embodiment comprising an arrangement of three cyclones lying next to one another around a circumference, in which the intake openings are controlled using a rotatable slider.

FIG. 2 depicts a second illustrative embodiment of the invention comprising an arrangement 20 of three cyclones 21, 22, and 23, which only differs from the embodiment shown in FIG. 1 in that it is a cylindrical arrangement 20, in which the cyclones 21, 22, and 23 are positioned on a circular path. An annular slider 24 is rotatably arranged in this embodiment, so that the visible openings 25 and 26 and a third opening, which is not visible, are appropriately positioned on the rotatable slider ring 24. The function of this arrangement, however, corresponds to that of the illustrative embodiment shown in FIG. 1.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A cyclone arrangement for separating particles or droplets from a fluid stream, comprising at least two cyclones arranged in parallel, each cyclone having a tangential intake opening for the fluid stream and acting to set a fluid stream introduced through the intake opening into rotation so that due to a resulting centrifugal force, particles or droplets to be separated from the fluid stream are deposited on an outer wall and discharged through a discharge opening at the bottom of each cyclone, wherein the cyclone intake openings are each closed or opened individually, wherein a plurality of the at least two cyclone intake openings are closed or opened by a common slider, said slider having openings for the fluid in the vicinity of the respective cyclone intake openings, and wherein the position and size of each slider opening is designed such that in various slider positions, the fluid stream reaches a different number of cyclone intake openings.

2. A cyclone arrangement according to claim 1, wherein for successively adjacent cyclones, the common slider has an first opening which only opens the intake opening of a first cyclone in a first slider position, and the slider has additional openings of increasing size which only open the respective intake openings of further cyclones in further slider positions as a function of the respective slider position.

3. A cyclone arrangement according to claim 1, wherein the cyclones are arranged in a linear row, and the slider comprises a translationally moved plate.

4. A cyclone arrangement according to claim 3, comprising three cyclones, and wherein in a first slider position, all three cyclones are accessible to the fluid stream; in a second slider position, the second and the third cyclones are accessible to the fluid; and in a third slider position, only the third cyclone is accessible to the fluid.

5. A cyclone arrangement according to claim 1, wherein the cyclones are arranged on a circular path, and the slider comprises a rotatable cylinder.

6. A cyclone arrangement according to claim 5, comprising three cyclones, and wherein in a first slider position, all three cyclones are accessible to the fluid stream; in a second slider position, the second and the third cyclones are accessible to the fluid; and in a third slider position, only the third cyclone is accessible to the fluid.

7. A cyclone arrangement according to claim 1, wherein the cyclone arrangement is disposed on an internal combustion engine crankcase vent line for separating oil droplets from crankcase vent gases.

8. A cyclone arrangement according to claim 1, wherein the cyclone arrangement is disposed on a fuel cell for separating water droplets from a gas streams the fuel cell.

* * * * *